Aug. 13, 1940.   G. T. BALFE   2,211,045
GASKET AND METHOD OF MANUFACTURING SAME
Filed Dec. 27, 1937   2 Sheets-Sheet 1
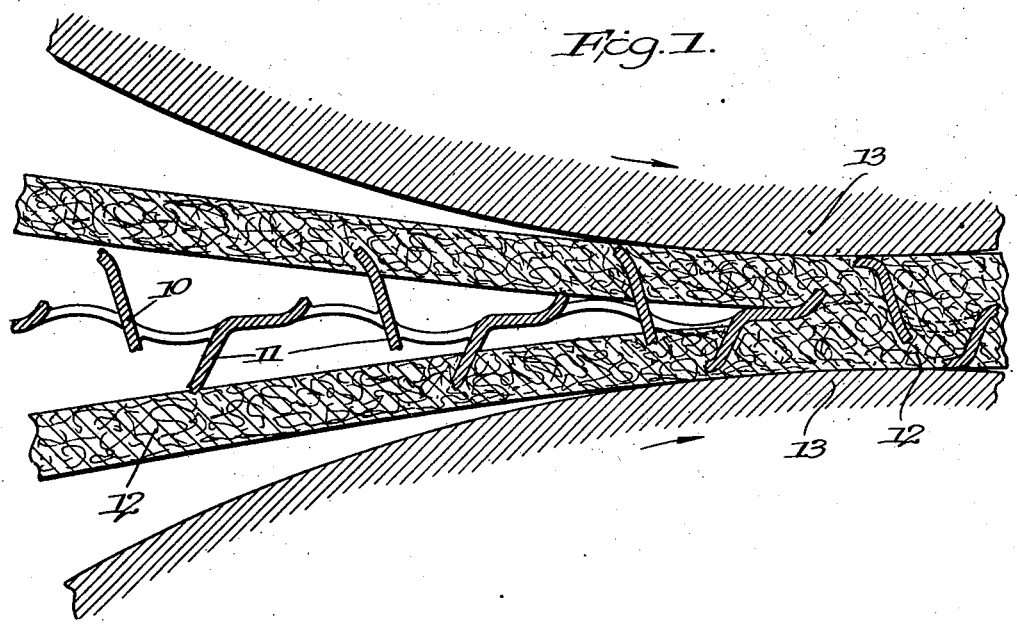
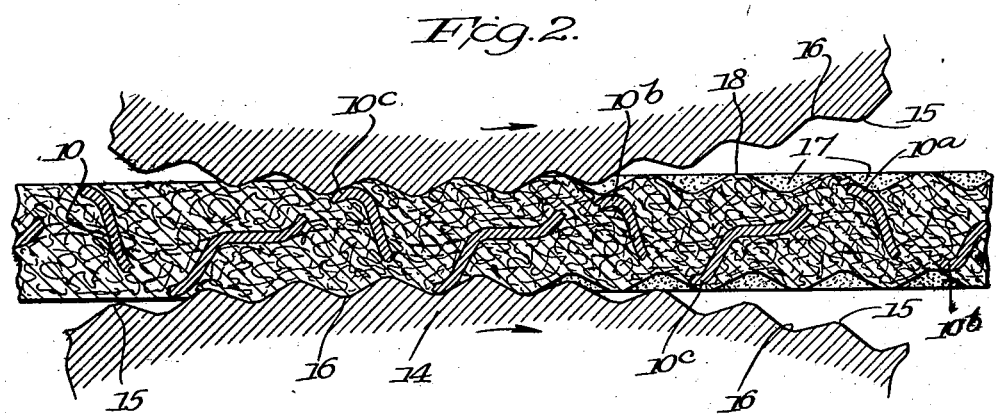
Inventor
George T. Balfe
By Cushman Darby & Cushman
Attorneys Aug. 13, 1940.  G. T. BALFE  2,211,045
GASKET AND METHOD OF MANUFACTURING SAME
Filed Dec. 27, 1937  2 Sheets-Sheet 2
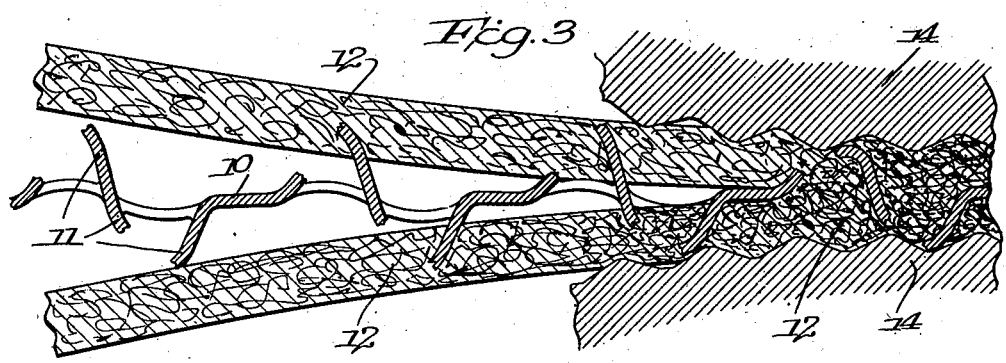
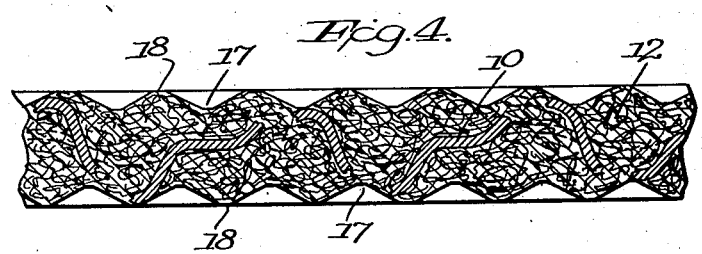
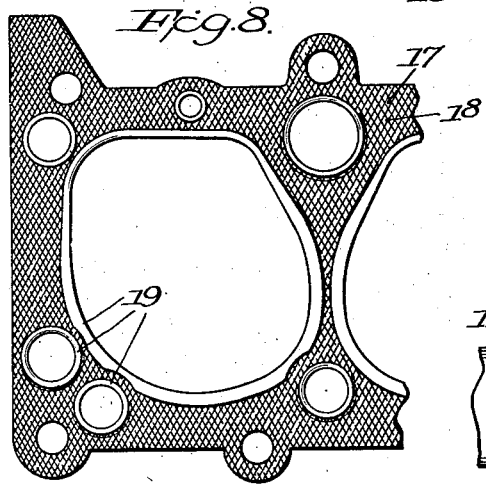
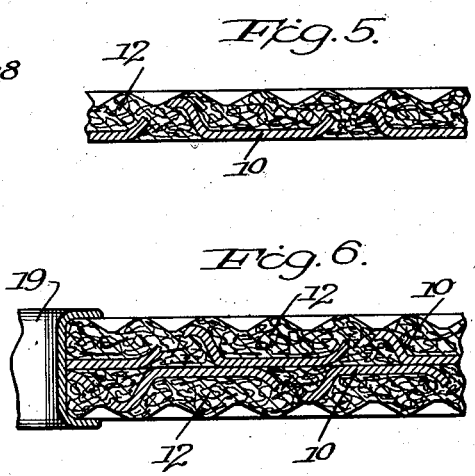
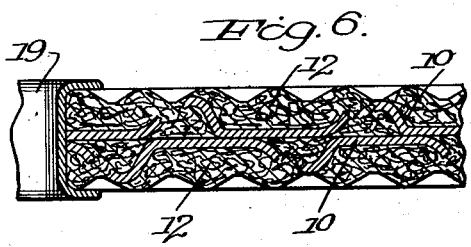
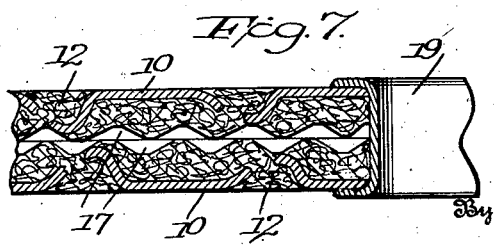
Inventor
George T. Balfe
By Cushman Darby & Cushman Attorneys Patented Aug. 13, 1940

2,211,045

UNITED STATES PATENT OFFICE 2,211,045

GASKET AND METHOD OF MANUFACTURING SAME

George T. Balfe, Detroit, Mich., assignor to Detroit Gasket & Manufacturing Company, Detroit, Mich., a corporation of Michigan Application December 27, 1937, Serial No. 181,947

19 Claims. (Cl. 154—33.1)

This invention relates to gaskets and methods of manufacturing the same.

The primary object of the invention is to increase the compressibility of gaskets of the Balfe type, for example, as shown in the patent to George T. Balfe, 1,776,140, September 16, 1930, without objectionably (1) varying the overall thickness of the gasket or (2) the density of the gasket material, from what standard practice has indicated as most effective in use.

Greater compressibility obtained by increasing the thickness of the cushion material layers of the gasket while maintaining standard density is undesirable because it objectionably affects the compression ratio of an internal combustion engine, and hence is impracticable from the engineering standpoint.

Increasing compressibility by decreasing the density of the cushion material has proven disastrous because such gaskets under compression in a motor were lacking both in required strength and compactness to resist blowing and burning and did not form an effective seal.

This problem of increasing compressibility without increased thickness or decreased density is solved by the present invention in accordance with which the efficient compression ratio of the motor is not altered, while at the same time, the required strength and compactness to afford optimum resistance in use is obtained, and the compressibility of the gasket is such that any unevenness in the sealing surfaces due, for example, to motor design, warped heads, or improper bolt spacing is accommodated, whereby an effective seal is formed.

Briefly, this invention provides a gasket in which for any given surface area including a multiplicity of tangs, the tangs are bent or deflected to varying degrees so that the cushion material such as asbestos in such area is differentially clinched at spaced points, i. e., in any area containing a multiplicity of tangs, the tangs are variably bent or the asbestos beneath each tang is clinched to varying degrees of pressure. Such variable bending of the tangs not only clinches variably the cushion material directly beneath the separate tangs but also provides a differential of compression of the cushion material between the tangs due to the fibrous character of the cushion material and the tendency of the clinching action to extend outwardly from each tang. Furthermore, in addition to the differential of compression obtained by the variable bending of the tangs, there is provided a compression differential between portions of the relatively unclinched cushion material between the tangs so that there is present a variable compression of the cushion material between the tangs independently of the extent to which such cushion material is maintained clinched or compressed by the tangs themselves.

Such a construction provides throughout the gasket surface a multiplicity of relatively small compressed areas forming a force-bearing body portion and alternately disposed with respect thereto, a multiplicity of relatively small more compressible areas. When the gasket is placed under compression in use, and compressed between the sealing surfaces, it will have a thickness within the predetermined tolerance permitted by the best engineering practice, and the density of the gasket will be such as to afford the required resistance to burning and blowing. Thus it is seen that the dense portions of the gasket give the required force-bearing strength and blow-out resistance, while the less dense, more compressible projections give the gasket the ability to conform perfectly to the irregularities of the bearing surface.

The gasket may be produced simply and effectively either by a single operation of combining the metal layer with the cushion layers, or the combining step may take place first followed by a treatment to impart the desired compressibility characteristic to the gasket.

Another feature of the present invention resides in reenforcing and/or strengthening the gasket with gromet means formed of stainless steel. For many purposes, I have discovered that the use of stainless steel gromets affords greater resistance to blowing and burning of the gasket under compression and therefore adds materially to the life of the product.

The gasket may take various forms other than those now to be described, and the methods for its manufacture may be considerably varied from the preferred procedure to be later outlined herein without departing from the spirit of this invention.

Referring to the drawings:

Figure 1 is an enlarged sectional view showing the operation of initially combining the metal and cushion layers.

Figure 2 is an enlarged sectional view showing one means of imparting to the gasket combination of Figure 1 a compressibility characteristic in accordance with this invention.

Figure 3 is an enlarged sectional view showing one method of combining the metal and cushion layers and simultaneously imparting the desired compressibility characteristic to the gasket.

Figure 4 is a sectional view of the article formed in accordance with the two-step operation of Figures 1 and 2 or the single operation of Figure 3.

Figures 5, 6 and 7 are sectional views of modifications, and,

Figure 8 is a top elevation of a portion of a cylinder head gasket.

The invention is useful in connection with gaskets generally, but is particularly applicable for automotive use, for example, in cylinder head gaskets, exhaust manifold gaskets, etc.

Referring to Figure 1, I have illustrated a metal layer 10 having a multiplicity of closely spaced or compacted projections 11 struck up therefrom. To opposite sides of this metal layer in combining relation are applied layers of cushion materials 12 such as asbestos of the usual standard density. The three layers are combined as by means of opposed pressure rolls 13 having smooth surfaces, the pressure employed being just sufficient or light enough to effect the permanent combination of the layers. The product formed by this operation is of an overall thickness greater than that of the standard gasket and has substantially smooth surfaces.

Following the combining operation, the gasket is subjected to an operation for the purpose of (1) reducing it to standard thickness and (2) enhancing its compressibility. In this operation, as above explained, (1) the tangs are variably bent or the asbestos beneath the different tangs is clinched to varying degrees of compression and at the same time (2) there is produced a differential of compression of the asbestos between the tangs independent of the extent to which the asbestos is maintained clinched or compressed by the effect of the tangs themselves.

One way of accomplishing this result is to pass the permanently combined material formed by the rolls 13 through a pair of pressure rolls 14 which are provided on their surfaces with a multiplicity of closely spaced relatively small alternately disposed ridges 15 and hollows 16. The contour of the ridges and hollows may have any desired form and is preferably uniform throughout the surfaces of the rolls so that there are an equal number of alternately disposed hollows and ridges or projections. Other means may be employed to effect this result and I do not wish to be limited to the use of rolls although such rolls are preferred, and are highly practical.

As the sheet or combination passes between the opposed rolls 14, as shown in Figure 2, the ridges or projections of the rolls contact with the tangs 11 at various points and variably compress the tangs. Thus, in a given area including a multiplicity of tangs, the tang 10a is lightly turned over, the tang 10b is very completely bent over and clinched and the tang 10c is turned over slightly more than the tang 10a but substantially less than the tang 10b. In this manner, the cushion material beneath the tangs is subjected to varying compression as is the cushion material immediately about the tangs due to the fibrous character of the asbestos material and the tendency of the clinching action to extend outwardly from each tang. Also it will be noted that the cushion material is formed with a multiplicity of closely spaced relatively small alternately disposed hollows 17 and more compressible projections or ridges 18 conforming in number and contour to the ridges and hollows 15 and 16. Thus, the cushion material between and independent of the tangs is further subjected to varying compression. The pressure exerted by the rolls 15 and 16, of course, may be varied as desired depending upon the gasket being formed, it being understood of course, that gaskets for various motors and manifolds have different final thicknesses and densities of cushion material.

The method just described embodies two steps, namely, (a) the combining step of Figure 1 and (b) the forming step of Figure 2.

In Figure 3, which is the preferred method, the same result is obtained in a single step or operation using the rolls 15 and 16 or other means to accomplish the desired result. The rolls 15 and 16 will be suitably adjusted to exert the desired combining and forming pressures simultaneously upon the three layers of material.

The product of the two step operation or the single step operation is illustrated in Figure 4 which has been sufficiently enlarged to show how the gasket at any given area including a multiplicity of tangs has the cushion material clinched to varying degrees, the tangs being bent or deflected to varying degrees so that the asbestos in such area is differentially bent at spaced points, that is, in any area containing the multiplicity of tangs, the tangs are variably bent or the asbestos beneath the tangs is clinched at varying degrees of compression. As explained, variable bending of the tangs not only clinches variably the asbestos directly beneath the separate tangs, but moreover, provides a differential of compression of the asbestos between the tangs due to the fibrous character of the asbestos material and the tendency of the clinching action to extend outwardly from each tang. Also as pointed out, the invention comprehends a variable compression of the asbestos between the tangs independently of the extent to which such asbestos is maintained clinched or compressed by the tangs themselves. In other words, in addition to the differential of the compression obtained by variable bending of the tangs, there is provided a differential between portions of the relatively unclinched asbestos between the tangs.

The gasket is illustrated in Figure 4 before it has been compressed between sealing surfaces. The thickness defined by the distance between the low points or bottoms of the hollows on opposite sides of the gasket is substantially the thickness of the standard gasket and the asbestos has the standard density before compression between surfaces to be sealed. The thickness defined by the distance between the tops of the ridges adds a slightly greater thickness to the standard gasket thickness and the cushion material is of slightly lower density at these points. However, although the area of each thickened portion is relatively very small, the compressibility afforded the gasket as a whole by a multiplicity of such compressible areas is materially enhanced. In actual use no weakness such as might be caused by burning or blowing has developed, and the gasket operates with increased efficiency and has a final thickness under compression which does not interfere with the optimum compression ratio of the motor. At the same time, the compressible areas permit the gasket to conform to any irregularities in the sealing surface due to motor design, warped heads, improper spacing of the bolts, etc.

As one example of a cylinder head gasket, formed as in Figure 4 and using cushion material of standard density, the overall thickness of the gasket between the tops of the projections is about eighty thousandths of an inch; the thickness between the bottoms of opposite hollows is substantially fifty-five thousandths of an inch; and the height of the ridges and the depths of the hollows in the gasket is about twelve and one-half thousandths of an inch. Under compression, in the motor, this gasket compresses to a thickness within the tolerance allowed by the automotive engineers for maximum efficient compression ratio of the motor, and the gasket has the required density and enhanced compressibility to form a tight seal and resist blowing and burning.

In Figure 5, I have shown a gasket in accordance with this invention and wherein the cushion material 12 is applied to only one side of the metal layer 10.

In Figure 6 I have shown a gasket in which two layers of the combined material shown in Figure 5 are superposed with the metal layers in contact and a suitable gromet or gromets 19 are employed for connecting the combined layers either at the peripheral edge of the gasket or at the edges of the gasket openings or both. In Figure 7 the construction is substantially like that shown in Figure 6 except that the cushion layers are in contact.

In Figure 8, I have illustrated, by way of example only, a cylinder head gasket embodying the constructions shown in Figures 4 to 7.

The gromets 19 may be used with any of the gaskets herein illustrated and are preferably continuous with the peripheral edge or the edges of the openings of the gasket. I have discovered that gromets made of stainless steel produce a very enhanced result in that they offer marked resistance to the heat and pressures encountered in the use of the gasket for automotive purposes.

I claim:

1. A gasket having a metal layer formed with a multiplicity of closely spaced projections, a layer of cushion material superposed on said metal layer and coextensive therewith, the projections of said metal layer being embedded in the cushion material and clinched thereto, the compressibility of the gasket varying in any given area thereof.

2. A gasket having a metal layer formed with a multiplicity of closely spaced projections, a layer of cushion material superposed on said metal layer and coextensive therewith, the projections of said metal layer being embedded in the cushion material and clinched thereto and said projections in any given area being variably bent whereby the compressibility of the gasket varies in said area.

3. A gasket having a metal layer formed with a multiplicity of closely spaced projections, a layer of cushion material superposed on said metal layer and coextensive therewith, the projections of said metal layer being embedded in the cushion material and clinched thereto, the cushion material beneath the projections in any given area being variably compressed whereby the compressibility of the gasket varies in said area.

4. A gasket having a metal layer formed with a multiplicity of closely spaced projections, a layer of cushion material superposed on said metal layer and coextensive therewith, the projections of said metal layer being embedded in the cushion material and clinched thereto, the cushion material between the projections in any given area being variably compressed whereby the compressibility of the gasket varies in said area.

5. A gasket having a metal layer formed with a multiplicity of closely spaced projections, layers of cushion material superposed on opposite sides of said metal layer and coextensive therewith, the projections of said metal layer being embedded in the cushion material and clinched thereto, the compressibility of the gasket varying in any given area thereof.

6. A gasket having a service opening therethrough and comprising two independently preformed composite layers, each layer being formed by a lamina of compressed cushion material and a lamina of sheet metal at least coextensive therewith and comprising a multiplicity of closely spaced projections extending substantially through the thickness of the cushion lamina to clinch the latter and being confined to said lamina, the projections being struck from the sheet metal layer and forming perforations therein through which the cushion material is exposed, the said composite layers being coextensive and being arranged in face to face relation with the metal exposed at the gasket surfaces, the multiplicity of perforations in each metal lamina providing metal surfaces readily conformable under pressure to the surfaces being sealed and the perforations therein permitting the cushion material to be brought to the gasket surfaces at a multiplicity of closely spaced points and to contact with the surfaces to be sealed when the gasket is subjected to pressure, the compressibility of the gasket varying in any given area thereof, and means independent of the projections connecting the composite layers.

7. A gasket having a service opening therethrough and comprising two independently preformed composite layers, each layer being formed by a lamina of compressed cushion material and a lamina of sheet metal at least coextensive therewith and comprising a multiplicity of closely spaced projections extending substantially through the thickness of the cushion lamina to clinch the latter and being confined to said lamina, the projections being struck from the sheet metal layer and forming perforations therein through which the cushion material is exposed, the said composite layers being coextensive and being arranged in face to face relation with the cushion laminae exposed at the gasket surfaces, the multiplicity of perforations in each metal lamina providing metal surfaces readily conformable under pressure to the surfaces being sealed, the compressibility of the gasket varying in any given area thereof, and means independent of the projections connecting the composite layers.

8. A gasket having a service opening therethrough and comprising two independently preformed composite layers, each layer being formed by a lamina of compressed cushion material and a lamina of sheet metal at least coextensive therewith and comprising a multiplicity of closely spaced projections extending substantially through the thickness of the cushion lamina to clinch the latter and being confined to said lamina, the projections being struck from the sheet metal layer and forming perforations therein through which the cushion material is exposed, the said composite layers being coextensive and being arranged in face to face relation with the cushion laminae exposed at the gasket surfaces, the multiplicity of perforations in each metal lamina providing metal surfaces readily conformable under pressure to the surfaces being sealed, and means independent of the projections connecting the composite layers, the compressibility of the gasket varying in any given area thereof.

9. A gasket having a metal layer formed with a multiplicity of closely spaced projections, a layer of cushion material superposed on said metal layer and coextensive therewith, the projections of said metal layer being embedded in the cushion material and clinched thereto, the compressibility of the gasket varying in any given area thereof, and a stainless steel gromet enclosing an exposed edge portion of the gasket.

10. A gasket having a metal layer formed with a multiplicity of closely spaced projections, a layer of cushion material superposed on said metal layer and coextensive therewith, the projections of said metal layer being embedded in the cushion material and clinched thereto, the cushion material beneath the projections and between the projections in any given area being variably compressed whereby the compressibility of the gasket varies in said area.

11. The method of making a variably compressible material having an uneven surface of varying density and containing a metallic reinforcing member which comprises compressing together a sheet of cushion material and a layer of metal having projections thereon and clinching said projections into said cushion material an unequal amount.

12. A method as described in claim 11 wherein the cushion material beneath the clinched projections is variably compressed.

13. A method as described in claim 11 wherein the cushion material between the clinched projections is variably compressed.

14. A method as described in claim 11 wherein the cushion material beneath and between the clinched projections is variably compressed.

15. The method of making a variably compressible material having an uneven surface of varying density and containing a metallic reinforcing member which comprises compressing together a sheet of cushion material and a layer of metal having projections thereon, partially clinching all of said projections into said cushion material an equal amount, and then further clinching said projections unequal amounts.

16. A gasket having a metal layer formed of a multiplicity of closely spaced projections, a layer of cushion material superposed on said metal layer and coextensive therewith, the projections of said metal layer being embedded in the cushion material and clinched thereto, the whole gasket having a dense compressed force-bearing body portion and a multiplicity of less compressed and more compressible projections on the surface thereof.

17. A gasket as described in claim 16 wherein the area of said surface projections is substantially smaller than the area of the dense compressed body portion.

18. A gasket having a metal layer formed with a multiplicity of closely spaced projections, a layer of cushion material placed on each side of said metal layer and coextensive therewith, the projections of said metal layer being embedded in the cushion material and clinched thereto, the whole gasket having a dense compressed force-bearing body portion and a multiplicity of less compressed and more compressible projections on the surface thereof.

19. A gasket as described in claim 18 wherein the area of said surface projections is substantially smaller than the area of the dense compressed body portion.

GEORGE T. BALFE.